(12) United States Patent
Crawford et al.

(10) Patent No.: US 12,366,259 B2
(45) Date of Patent: Jul. 22, 2025

(54) SPRINKLER WITH TRELLIS WIRE MOUNTING CLIP

(71) Applicant: Nelson Irrigation Corporation, Walla Walla, WA (US)

(72) Inventors: Steven E. Crawford, Walla Walla, WA (US); John N. Rowley, Walla Walla, WA (US); Andrew B. Hellie, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 228 days.

(21) Appl. No.: 18/452,843

(22) Filed: Aug. 21, 2023

(65) Prior Publication Data

US 2025/0067289 A1    Feb. 27, 2025

(51) Int. Cl.
*F16B 2/20* (2006.01)
*F16M 13/02* (2006.01)

(52) U.S. Cl.
CPC .............. *F16B 2/20* (2013.01); *F16M 13/02* (2013.01)

(58) Field of Classification Search
CPC .................................. F16B 2/20; F16M 13/02
USPC ..... 248/65, 74.1, 74.2, 316.7; 239/264, 265, 239/273, 283
See application file for complete search history.

(56) References Cited

U.S. PATENT DOCUMENTS

| | | | |
|---|---|---|---|
| 995,298 A | 6/1911 | Sims | |
| 2,094,544 A | 9/1937 | Leja | |
| 2,464,015 A | 3/1949 | Young | |
| 3,906,592 A | 9/1975 | Sakasegawa et al. | |
| 4,240,604 A | 12/1980 | Brach | |
| 4,591,285 A * | 5/1986 | Nelson | F16L 3/13 403/11 |
| 4,763,390 A * | 8/1988 | Rooz | A47G 25/485 24/562 |
| 5,263,671 A * | 11/1993 | Baum | B62K 19/30 248/68.1 |
| 6,096,956 A | 8/2000 | Hoshino | |
| 6,651,938 B1 * | 11/2003 | Moreland | F16L 3/1215 248/61 |
| 8,083,188 B2 | 12/2011 | Kittle et al. | |
| 10,195,387 B2 | 2/2019 | Gulliver et al. | |
| 10,221,518 B2 | 3/2019 | Schapiro | |
| 10,239,066 B2 * | 3/2019 | Sesser | B05B 3/008 |
| 10,399,108 B2 * | 9/2019 | Crawford | B05B 3/003 |
| 10,683,602 B1 | 6/2020 | Henry et al. | |
| 10,881,782 B2 | 1/2021 | Behrens | |
| 11,325,147 B2 * | 5/2022 | Crawford | B05B 3/005 |
| 11,432,481 B2 | 9/2022 | Drechsel | |

(Continued)

FOREIGN PATENT DOCUMENTS

| CA | 3164960 C | 2/2023 |
|---|---|---|
| CN | 201953751 U | 8/2011 |

(Continued)

*Primary Examiner* — Todd M Epps
(74) *Attorney, Agent, or Firm* — NIXON & VANDERHYE P.C.

(57) ABSTRACT

A mounting system and clip for mounting a sprinkler on a trellis wire. The clip includes a first living hinge, an actuator on one side of the first living hinge, and a gripping channel on an opposite side of the first living hinge. A locking tab is attached to the gripping channel via a second living hinge.

18 Claims, 5 Drawing Sheets

(56) References Cited

U.S. PATENT DOCUMENTS

| | | | |
|---|---|---|---|
| 11,745,207 B2* | 9/2023 | Crawford | ................ B05B 15/65 239/233 |
| 2015/0122957 A1 | 5/2015 | Michiels | |
| 2019/0323630 A1 | 10/2019 | Doppelbauer | |
| 2020/0408334 A1 | 12/2020 | Proulx et al. | |
| 2022/0316623 A1 | 10/2022 | Newton | |

FOREIGN PATENT DOCUMENTS

| | | |
|---|---|---|
| CN | 106523791 B | 6/2019 |
| CN | 209925774 U | 1/2020 |
| CN | 215522262 U | 1/2022 |
| CN | 218031826 U | 12/2022 |
| CN | 218267660 U | 1/2023 |
| CN | 218625777 U | 3/2023 |
| DE | 102017006862 A1 | 1/2018 |
| EP | 3572699 B1 | 3/2022 |
| FR | 2623857 B1 | 3/1990 |
| JP | H0260580 B2 | 12/1990 |
| JP | 4324930 B2 | 6/2009 |
| JP | 2020045934 A | 3/2020 |
| JP | 7144731 B2 | 9/2022 |
| JP | 3241771 U | 4/2023 |
| JP | 2023053584 A | 4/2023 |
| WO | 2007021437 A2 | 2/2007 |
| WO | 2022011453 A1 | 1/2022 |

* cited by examiner

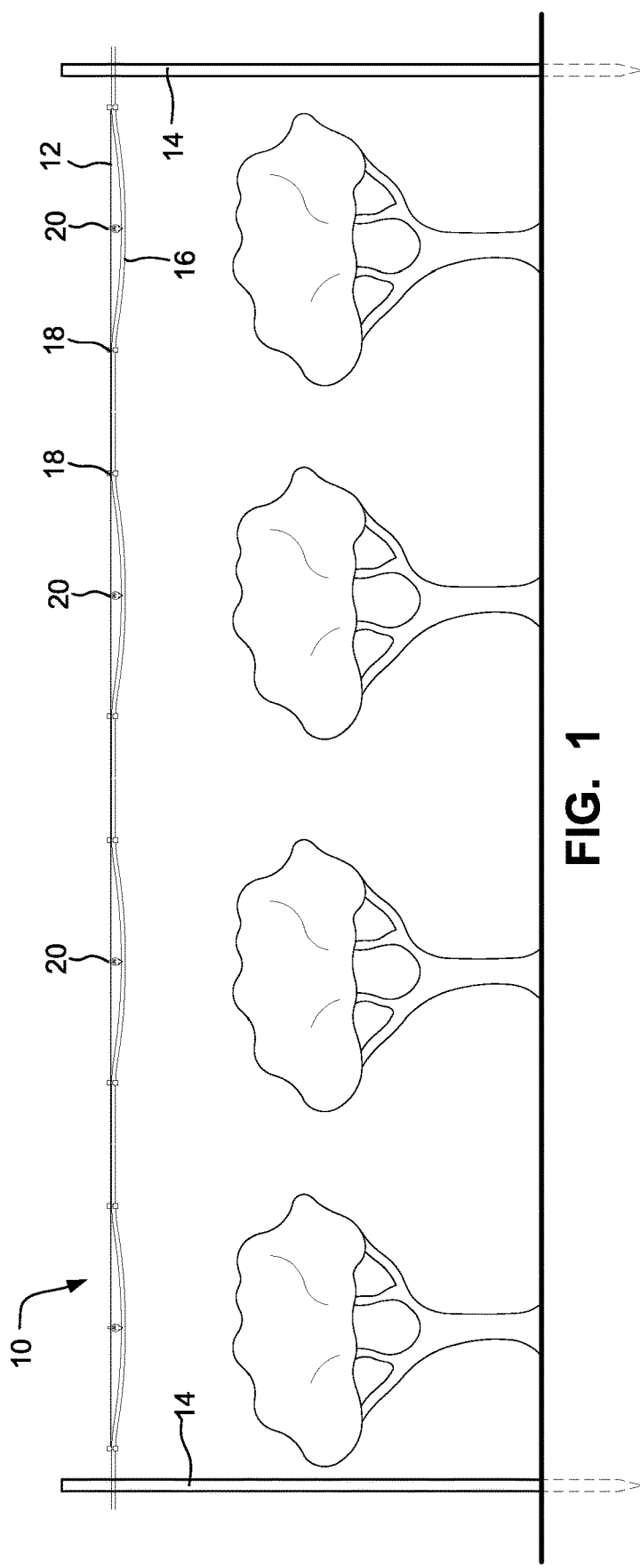
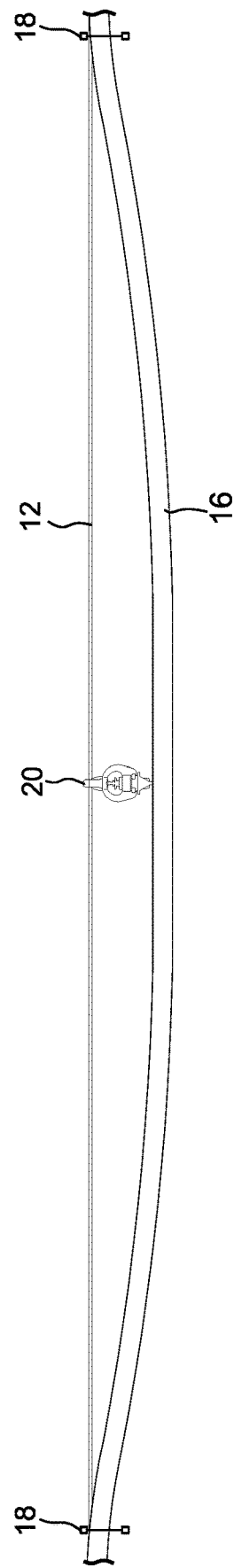
FIG. 1
FIG. 2

SPRINKLER WITH TRELLIS WIRE MOUNTING CLIP

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to a sprinkler mounting system and, more particularly, to a sprinkler mounting system that provides stable above-ground mounting for spinning and reactionary drive sprinklers.

Stabilizing reactionary drive sprinklers has been unsuccessful with existing designs that hang sprinklers from a lateral wire or tube without bottom support. Existing designs are subject to swaying caused by horizontal forces on the sprinklers.

Sprinklers mounted on the ground include stakes and feed tubing that can get in the way of normal farming operations (i.e., mowing, spraying, weeding and harvesting).

SUMMARY

The mounting system of the described embodiments replaces the need for mounting the sprinkler on individual stakes for both overhead and near-ground watering. A trellis wire is mounted to posts and anchored at the ends. A lateral line (e.g., a plastic tube lateral line) is then bound to the trellis wire leaving gaps for a clip/sprinkler/adapter assembly to mount between binding locations. The clip/sprinkler/adapter assembly is connected at the bottom with a barb through the top of the lateral line. The top is secured to the trellis wire via the clip of the described embodiments.

In an exemplary embodiment, a clip for mounting a sprinkler on a trellis wire includes a first living hinge, an actuator on one side of the first living hinge, a gripping channel on an opposite side of the living hinge, and a locking tab attached to the gripping channel via a second living hinge.

The gripping channel may include a shoulder adjacent a distal end.

The gripping channel may include an upper leg and a lower leg, where the locking tab may be attached to the upper leg via the second living hinge. The lower leg may include a lock extension at a distal end, and the locking tab may be selectively engageable with the lock extension. The lower leg may include a first width from the distal end to an intermediate point, and the lower leg may include a second width from the intermediate point to the first living hinge. The first width may be narrower than the second width defining a stop for the clip. The gripping channel may include a shoulder adjacent a distal end, and the shoulder may be forward of the stop such that the shoulder and the stop engage and secure opposite sides of the sprinkler.

The actuator may be displaceable between a closed position and an open position, and the first living hinge may bias the actuator toward the closed position.

The gripping channel may be configured to receive the sprinkler and the trellis wire.

In another exemplary embodiment, a sprinkler mounting system includes first and second posts, a trellis wire connected between the first and second posts, and a lateral line coupled with a source of water and connected to the trellis wire. A plurality of sprinklers are connected between the trellis wire and the lateral line, where each of the plurality of sprinklers is secured to the lateral line via the clip of the described embodiments. Each of the plurality of sprinklers is securable in the gripping channel, and the gripping channel is securable on the trellis wire.

The sprinkler mounting system may include binding clips that connect the lateral line to the trellis wire, where each of the plurality of sprinklers is connected between the trellis wire and the lateral line between the binding clips. Each of the plurality of sprinklers may include a barb at a distal end, where the barb of each of the plurality of sprinklers extends into the lateral line. The gripping channel may be larger than a diameter of the trellis wire such that each of the plurality of sprinklers can slide horizontally on the trellis wire during mounting and can accommodate thermal expansion/contraction.

BRIEF DESCRIPTION OF THE DRAWINGS

These and other aspects and advantages will be described in detail with reference to the accompanying drawings, in which:

FIG. 1 shows a sprinkler mounting system according to an exemplary embodiment;

FIG. 2 shows a sprinkler mounted on the trellis wire;

DETAILED DESCRIPTION

Figure 3:
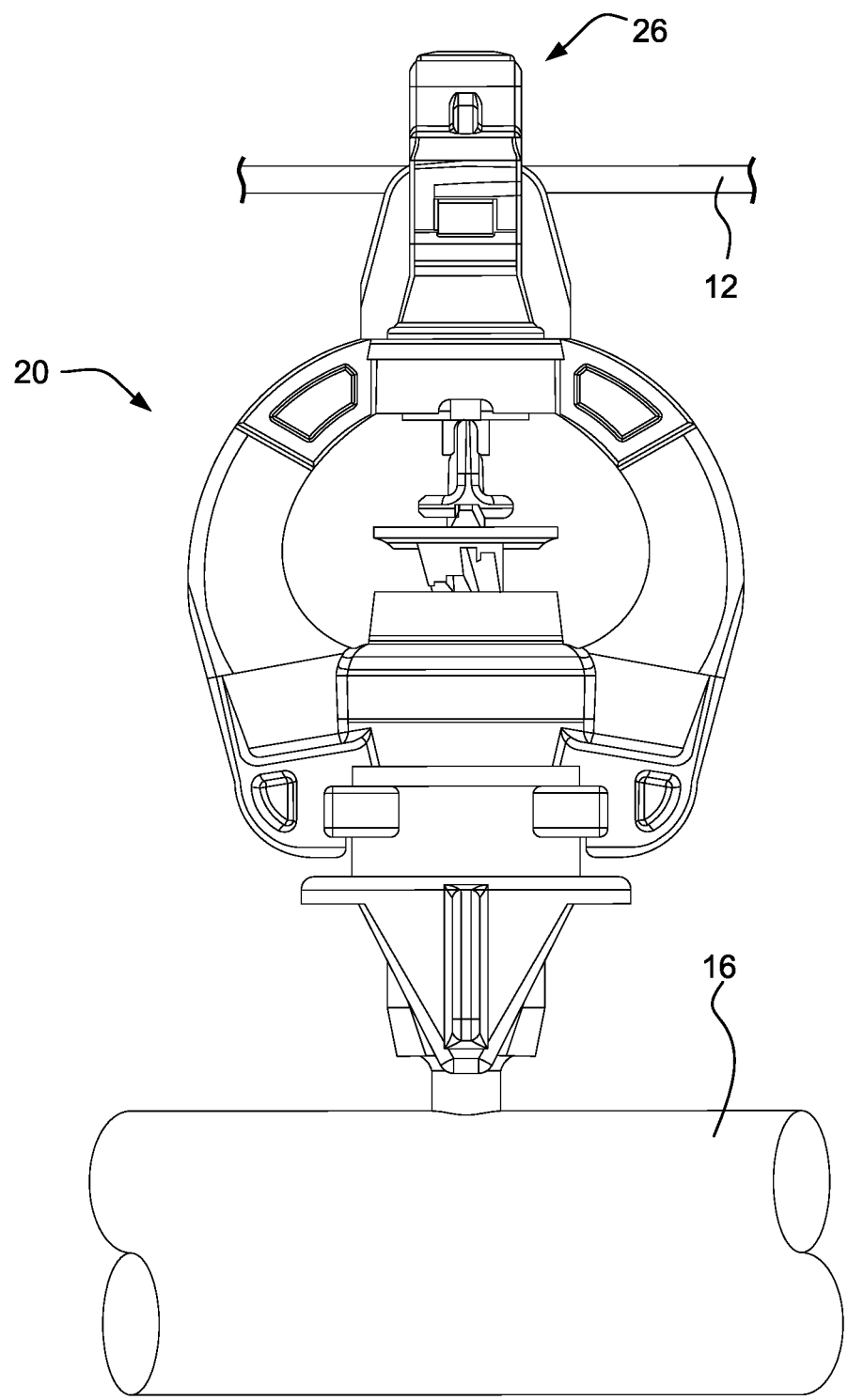
FIGS. 3 and 4 are close-up views of the sprinkler secured between the trellis wire and the lateral line.

FIG. 1 shows an exemplary sprinkler mounting system 10 that replaces the need for mounting sprinklers on individual stakes for both overhead and near-ground watering. A trellis wire 12 is mounted to first and second posts 14 and anchored at its ends. A lateral line 16 in the form of a plastic tube or the like is coupled with a source of water and is connected to the trellis wire 12 via suitable binding clips 18. A plurality of sprinklers 20 are connected between the trellis wire 12 and the lateral line 16.

FIG. 2 shows a single sprinkler 20 secured between the trellis wire 12 and the lateral line 16 in a section of the trellis wire 12 and lateral line 16 between binding clips 18.

Figure 4:
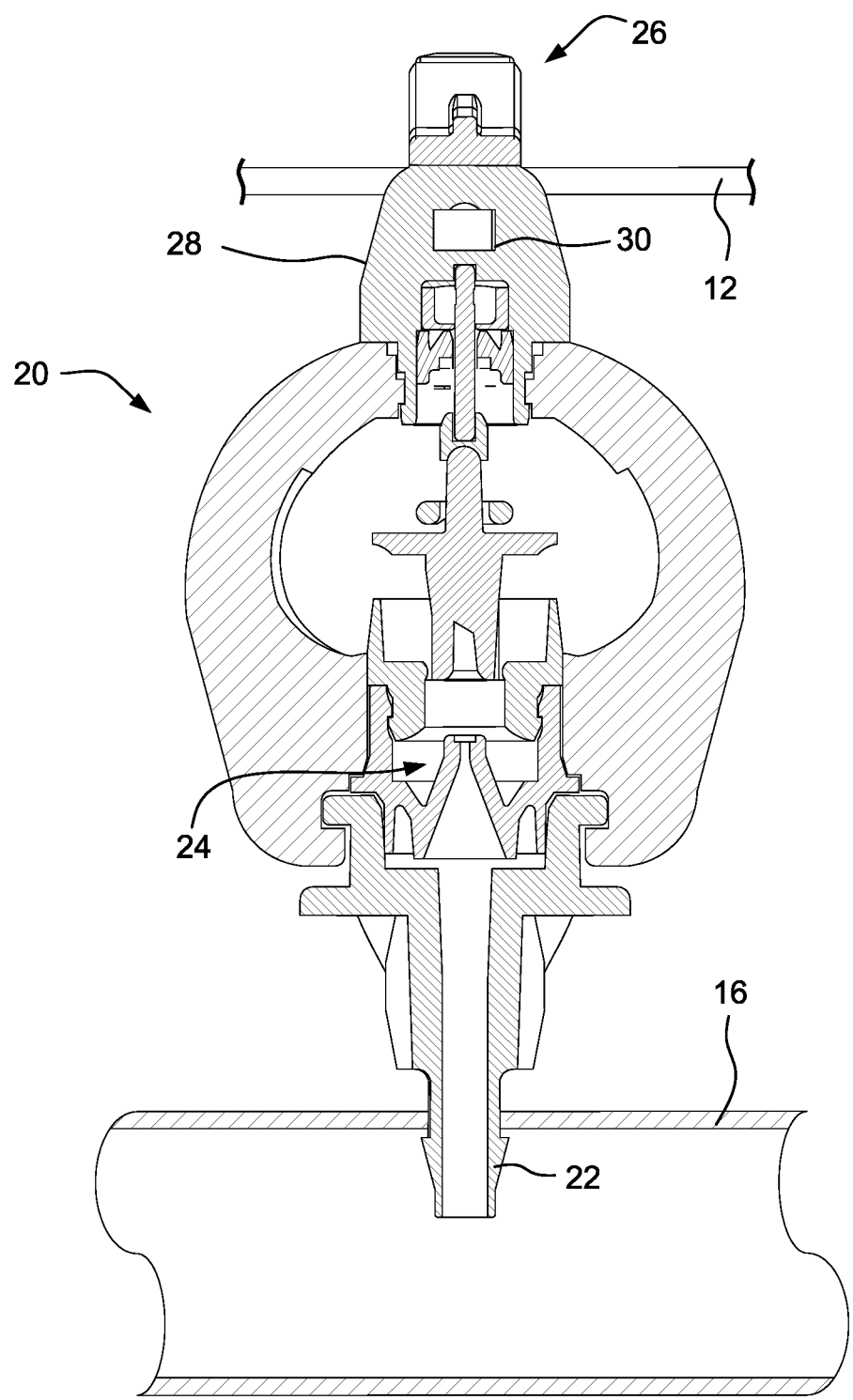

With reference to FIGS. 3 and 4, each sprinkler 20 includes a barb 22 at a distal end that extends into the lateral line 16. Water in the lateral line 16 is fed to a sprinkler nozzle 24. In some embodiments, an opening smaller than the barb 22 is punched in the lateral line 16, and the barb 22 is pressed into the lateral line 16. The lateral line 16 may be formed of a soft but resilient material that creates a seal around the barb 22.

Figure 5:
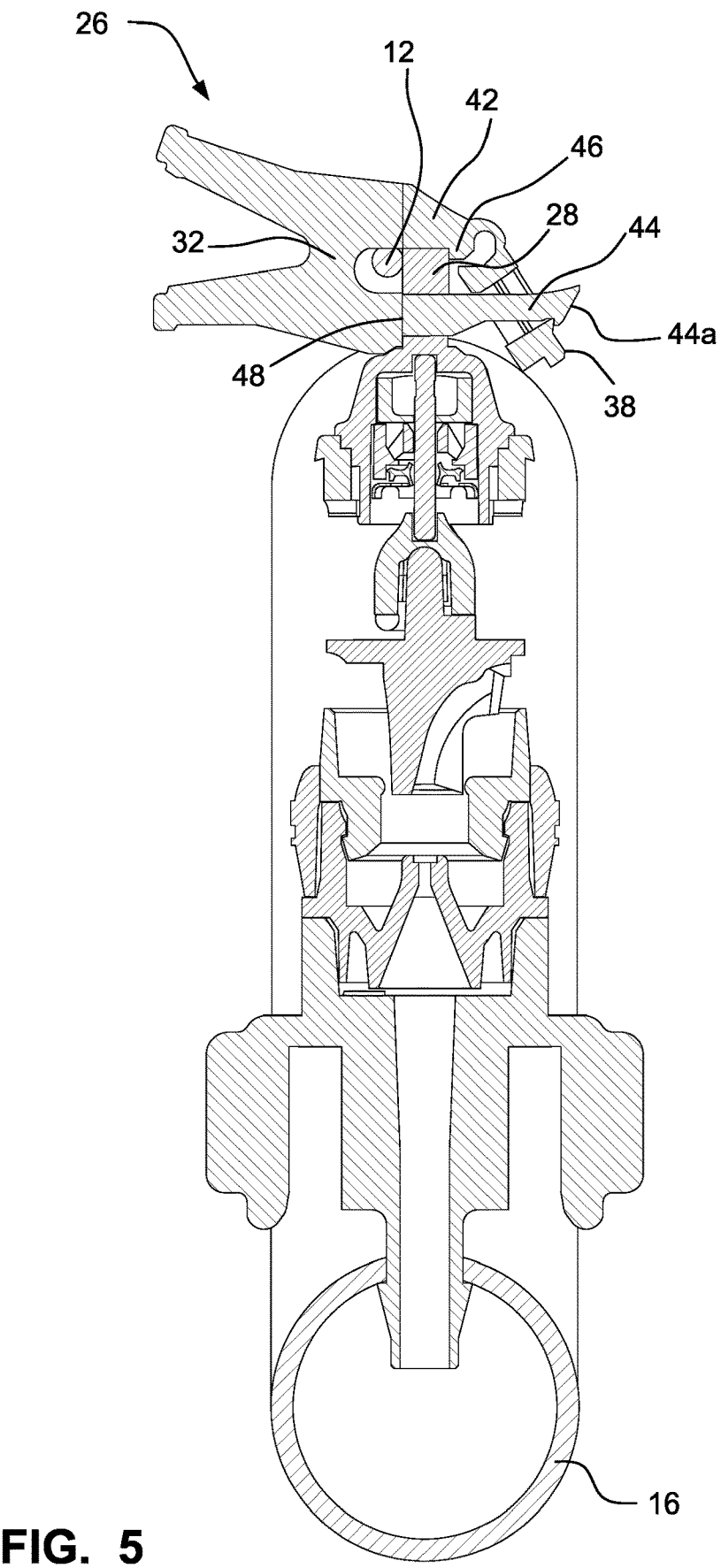
FIG. 5 shows the clip in a locked or closed position.
Figure 6:
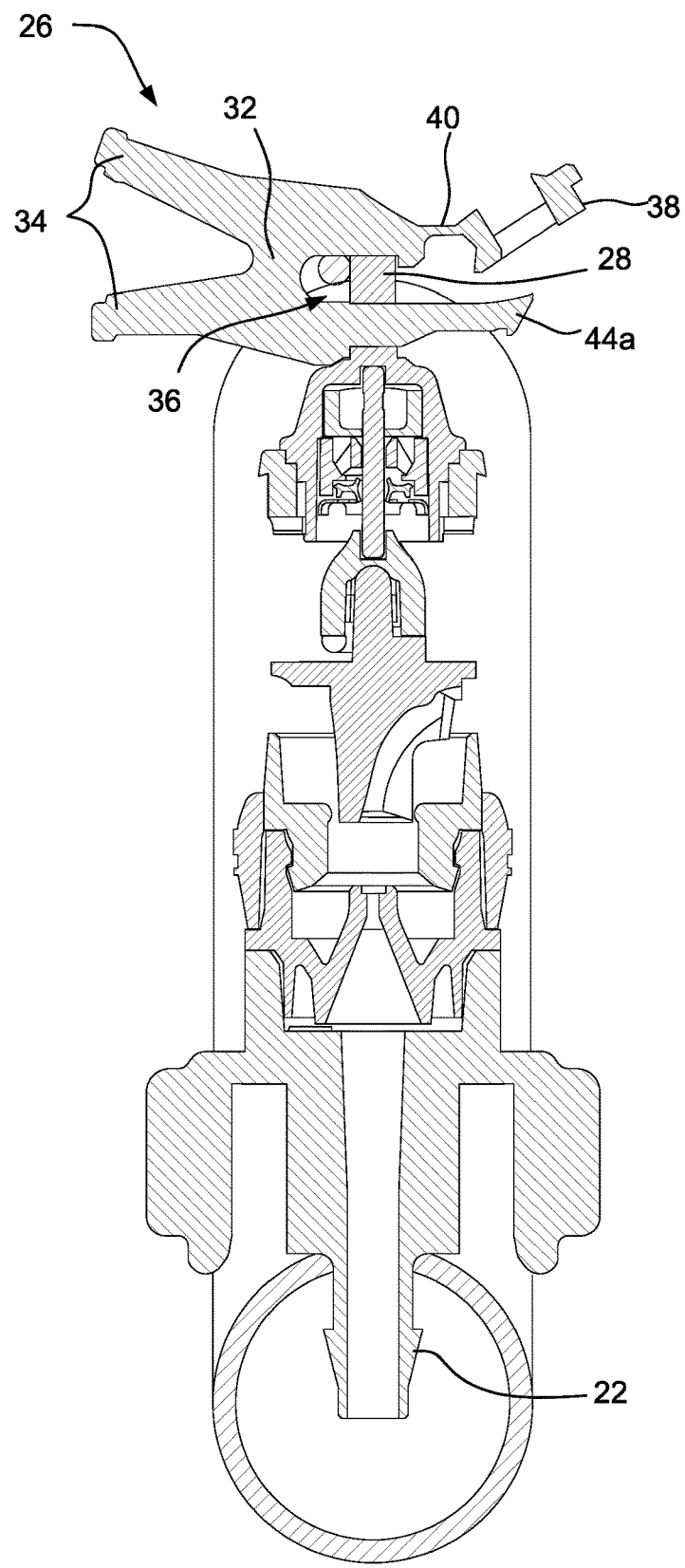
FIG. 6 shows the clip in an unlocked or open position.

An opposite end of the sprinkler 20 is secured to the trellis wire 12 via a clip 26. With reference to FIGS. 4-6, each of the sprinklers 20 includes a bracket 28 on top of the sprinkler with an opening 30. As described in more detail below, the clip 26 cooperates with the opening 30 to secure the sprinkler 20 to the trellis wire 12.

With reference to FIGS. 5-6, the clip 26 includes a first living hinge 32, an actuator 34 on one side of the first living hinge 32, and a gripping channel 36 on an opposite side of the first living hinge 32. In some embodiments, the actuator 34 is a pinch actuator or the like that is displaceable between a closed position in which the gripping channel 36 grips the mounting bracket 28 and an open position in which the gripping channel 36 releases the mounting bracket 28. The first living hinge 32 biases the actuator 34 toward the closed position.

A locking tab 38 is attached to the gripping channel 36 via a second living hinge 40.

The gripping channel 36 includes an upper leg 42 and a lower leg 44. The locking tab 38 is attached to the upper leg 42 via the second living hinge 40. The upper leg 42 of the gripping channel 36 includes a shoulder 46 adjacent a distal end. The shoulder 46 engages the mounting bracket 28 when the clip 26 is fully inserted into the mounting bracket 28.

The lower leg 44 extends through the opening 30 in the mounting bracket 28. In some embodiments, the lower leg 44 has a first width from its distal end to an intermediate point 48. The first width is configured to fit through the opening 30 in the mounting bracket 28. The lower leg 44 has a second wider width from the intermediate point 48 to the first living hinge 32. The wider width defines a stop for the clip relative to the sprinkler. With particular reference to FIG. 5, the shoulder 46 is forward of the stop such that the shoulder 46 and the stop engage and secure opposite sides of the mounting bracket 28.

As shown, the gripping channel 36 is configured to receive the sprinkler via the mounting bracket 28 and to receive the trellis wire 12. As such, each of the sprinklers 20 can slide horizontally on the trellis wire 12 during mounting and can accommodate thermal expansion/contraction.

The lower leg 44 of the gripping channel 36 includes a lock extension 44a at a distal end. The locking tab 38 is selectively engageable with the lock extension 44a. FIG. 6 shows the locking tab 38 disengaged from the lock extension 44a. In this position, the actuator 34 can be pinched to remove from or reposition the sprinkler on the trellis wire 12. The locking tab 38 can be pivoted on the second living hinge 40 into engagement with the lock extension 44a. The lock extension 44a may include a barb that secures the locking tab 38 in the locked position shown in FIG. 5. In this position, the sprinkler 20 is held securely on the trellis wire 12. Additionally, in the locked position, the assembly supports any vertical load that is produced by the hanging weight of the sprinkler 20 and the lateral line 16. The locking tab 38 can be removed from the lock extension 44a by pushing up on the lock extension 44a and then swinging the locking tab 38 via the second living hinge 40.

The sprinkler mounting assembly and clip of the described embodiments can provide stable mounting to both spinning and reactionary drive sprinklers. The top and bottom support of the sprinklers fixes the swaying experienced with existing systems caused by horizontal forces put on the sprinklers by the rotating stream.

The squeeze actuator facilitates installation of the sprinklers on the trellis wire. The shoulder and stop are used to hold the sprinkler once it has been moved into position and the actuator is released. The locking tab is pivoted on the living hinge into engagement with the lock extension and supports any vertical load that is produced by the hanging weight of the sprinkler and the lateral line. The sprinkler is held from rotating (about a vertical axis through the middle of the sprinkler) by the clip trapping the trellis wire and the wide face of the top of the sprinkler. The size of the gripping channel allows the sprinkler to slide horizontally on the trellis wire during mounting and can accommodate thermal expansion/contraction. The combination of the clip and lower barb mount aligns the sprinkler vertically and resists side-to-side swaying during water applications.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A clip for mounting a sprinkler on a trellis wire, the clip comprising:
    a first living hinge;
    an actuator on one side of the first living hinge;
    a gripping channel on an opposite side of the first living hinge; and
    a locking tab attached to the gripping channel via a second living hinge.

2. The clip according to claim 1, wherein the gripping channel comprises a shoulder adjacent a distal end.

3. The clip according to claim 1, wherein the gripping channel comprises an upper leg and a lower leg, wherein the locking tab is attached to the upper leg via the second living hinge.

4. The clip according to claim 3, wherein the lower leg comprises a lock extension at a distal end, and wherein the locking tab is selectively engageable with the lock extension.

5. The clip according to claim 3, wherein the lower leg comprises a first width from a distal end to an intermediate point, and the lower leg comprises a second width from the intermediate point to the first living hinge, and wherein the first width is narrower than the second width defining a stop for the clip.

6. The clip according to claim 5, wherein the gripping channel comprises a shoulder adjacent a distal end, and wherein the shoulder is forward of the stop such that the shoulder and the stop engage and secure opposite sides of the sprinkler.

7. The clip according to claim 1, wherein the actuator is displaceable between a closed position and an open position, and wherein the first living hinge biases the actuator toward the closed position.

8. The clip according to claim 1, wherein the gripping channel is configured to receive the sprinkler and the trellis wire.

9. A sprinkler mounting system comprising:
    first and second posts;
    a trellis wire connected between the first and second posts;
    a lateral line coupled with a source of water and connected to the trellis wire; and
    a plurality of sprinklers connected between the trellis wire and the lateral line, wherein each of the plurality of sprinklers is secured to the lateral line via a clip, the clip including:
        a first living hinge,
        an actuator on one side of the first living hinge,
        a gripping channel on an opposite side of the first living hinge, and
        a locking tab attached to the gripping channel via a second living hinge,
    wherein each of the plurality of sprinklers is securable in the gripping channel, and wherein the gripping channel is securable on the trellis wire.

10. The sprinkler mounting system according to claim 9, further comprising binding clips that connect the lateral line to the trellis wire, wherein each of the plurality of sprinklers is connected between the trellis wire and the lateral line between the binding clips.

11. The sprinkler mounting system according to claim 9, wherein each of the plurality of sprinklers comprises a barb at a distal end, and wherein the barb of each of the plurality of sprinklers extends into the lateral line.

12. The sprinkler mounting system according to claim 9, wherein the gripping channel is larger than a diameter of the trellis wire such that each of the plurality of sprinklers can slide horizontally on the trellis wire during mounting and can accommodate thermal expansion/contraction.

13. The sprinkler mounting system according to claim 9, wherein the gripping channel comprises a shoulder adjacent a distal end.

14. The sprinkler mounting system according to claim 9, wherein the gripping channel comprises an upper leg and a lower leg, wherein the locking tab is attached to the upper leg via the second living hinge.

15. The sprinkler mounting system according to claim 14, wherein the lower leg comprises a lock extension at a distal end, and wherein the locking tab is selectively engageable with the lock extension.

16. The sprinkler mounting system according to claim 14, wherein the lower leg comprises a first width from a distal end to an intermediate point, and the lower leg comprises a second width from the intermediate point to the first living hinge, and wherein the first width is narrower than the second width defining a stop for the clip.

17. The sprinkler mounting system according to claim 16, wherein the gripping channel comprises a shoulder adjacent a distal end, and wherein the shoulder is forward of the stop such that the shoulder and the stop engage and secure opposite sides of the sprinkler.

18. The sprinkler mounting system according to claim 9, wherein the actuator is displaceable between a closed position and an open position, and wherein the first living hinge biases the actuator toward the closed position.

\* \* \* \* \*